United States Patent
Olvera-Camacho

(10) Patent No.: US 6,217,337 B1
(45) Date of Patent: Apr. 17, 2001

(54) METHOD FOR OBTAINING A TABULATION TO DISPLAY A RANGE OF COLORS WHICH CAN BE REPRODUCED WITH ACCURACY

(76) Inventor: Roberto Olvera-Camacho, Suderman No. 213, Desp. 101, Polanco, Delegacion Miguel Hidalgo, Mexico D.F. 11560 (MX)

( * ) Notice: Subject to any disclaimer, the term of this patent is extended or adjusted under 35 U.S.C. 154(b) by 0 days.

(21) Appl. No.: 09/380,235

(22) PCT Filed: Feb. 27, 1998

(86) PCT No.: PCT/MX98/00008

§ 371 Date: Oct. 27, 1999

§ 102(e) Date: Oct. 27, 1999

(87) PCT Pub. No.: WO98/38044

PCT Pub. Date: Sep. 3, 1998

(30) Foreign Application Priority Data

Feb. 28, 1997 (MX) .................................................. 971593

(51) Int. Cl.[7] .................................................. G09B 11/10
(52) U.S. Cl. ............................ 434/84; 434/81; 358/518; 101/211
(58) Field of Search ............................ 358/518; 101/211; 434/81, 84

(56) References Cited

U.S. PATENT DOCUMENTS

| | | | |
|---|---|---|---|
| 1,900,140 | * | 3/1933 | Tuttle ................................... 101/211 |
| 3,450,044 | * | 6/1969 | Dixon ................................... 101/211 |
| 3,951,668 | * | 4/1976 | Schumacher et al. ................. 106/20 |
| 4,908,712 | * | 3/1990 | Uchiyama ............................ 358/298 |

FOREIGN PATENT DOCUMENTS

| | | | |
|---|---|---|---|
| 0059961A2 | * | 3/1982 | (EP) . |
| 0 059 951 | | 9/1982 | (EP) . |
| 0 590 921 | | 4/1994 | (EP) . |
| 0590921A | * | 4/1994 | (EP) . |
| 506581 | * | 5/1941 | (GB) . |
| 506 581 | | 5/1941 | (GB) . |
| 2 258 427 | | 2/1993 | (GB) . |
| 2258427A | * | 3/1993 | (GB) . |
| WO8503581 | * | 8/1985 | (WO) . |
| WO 95/03581 | | 8/1985 | (WO) . |
| WO 95/27923 | | 10/1995 | (WO) . |
| WO9527923 | * | 10/1995 | (WO) . |

\* cited by examiner

*Primary Examiner*—Jacob K. Ackun
*Assistant Examiner*—Bena B. Miller
(74) *Attorney, Agent, or Firm*—Helfgott & Karas, P.C.

(57) ABSTRACT

A method for obtaining a tabulation to display a range of colors which can be reproduced with accuracy is described; which is obtained through the application of a color volume calculated based on the following expression:

$$T = (10V)^{1/2} \qquad (I)$$

wherein:

T=the color shade in percentage (%);
V=the color volume in volumetric units.

4 Claims, No Drawings

METHOD FOR OBTAINING A TABULATION TO DISPLAY A RANGE OF COLORS WHICH CAN BE REPRODUCED WITH ACCURACY

FIELD OF THE INVENTION

This invention relates to the color leveling and selection fields within the dyestuff industry and, more particularly, to a method for obtaining a tabulation to display a range of colors which can be reproduced with accuracy.

BACKGROUND OF THE INVENTION

It is well known that in the present state of the art several methods are available to the obtaining and leveling of colors, by means of which color shades can be obtained highly resembling those previously specified color shades. The color shades obtained during the leveling process, however, do not comply 100% with the required color shade as, during the final color adjustment step, it is started from a subjective comparison as when the color to be obtained is compared to a color taken as a reference. Said comparison is effected by employing the criterium of a person skilled in color leveling or by employing some computerized system for color comparison.

On the other side, in the graphic arts industry several printing methods are known among which a plain colors printing method is common as well as a process colors printing method.

Printing through plain colors requires solid color opaque inks, each resulting from a mixture of different pigments, thus obtaining a diversity of colors; while the printing method through process colors requires of four pigments of standard transparent inks, namely, yellow, magenta, cyan and black.

In the printing method through process colors, small points or half-tone screens are generated, so as to form a printing mesh for each of the colors, and said meshes are arranged over one another.

Both in the plain colors printing method and in the process colors printing method, obtaining and leveling the color shades is a subjective problem, as in both methods it is started from a previously printed reference in order to define the required color; but this means not that the color obtained at the end of the operation be accurately the selected one.

In case of plain color printing, when a slightly clearer color is desired, white pigment is added; while for a darker shade black pigment or one or more dark pigments are added.

When the printing is already in press, clearer shades can be obtained in solid plain color inks, by employing a point mesh or screen on the paper, thus allowing that a bit more of the papel whitness appears.

As far as the process colors printing concerns, the various standard ink combinations of process colors (yellow, magenta, cyan and black), when used in different percentages of point sizes or screens, provide for the creation of an entire range of colors constituting the color gradation that can be obtained through the use of said printing method.

During the printing method through process colors, a press spreads on the paper the transparent yellow, magenta, cyan and black inks, as small points or half-tone screens, each of which varies in size from 1 up to 99 percent. In general, the following sequential order of application is employed during the printing: black, cyan, magenta and yellow.

It is important to mention that the color range to be obtained by means of the combination of said four standard process colors is more limited than the color range obtained with the ink solid colors; therefore, when the process colors printing is used, always will result in colors which are far away from many of the ink solid colors. This implies that only a simulation of many of the ink solid colors is possible with the use of the four process colors; and this, necessarily, ends with an unsatisfaction for the end user.

Presently those skilled in standard process colors carry out the color selection by employing color charts with samples of solid colors; which, as already mentioned, results in a simulation of the required color shade; whereby the color Presently those skilled in standard process colors carry out the color selection by employing color charts with samples of solid colors; which, as already mentioned, results in a simulation of the required color shade; whereby the color obtained when printing with process colors does not suitably satisfy the requirements of the end user.

In the prior art exists several color separation processes for determining the proportion of the different inks, namely cyan, magenta, yellow and black to be used in the printing process, wherein an amount of black ink substitutes a partial amount of each of the color inks used.

International Publication No. WO 85/03581 discloses a four color printing process which uses three subtractive primary colors and black.

The process described in this document established that during the color separation phase for printing, the substractive primary color of least intensity in each printing area is totally removed and compensated by black, whereby each printing area contains a maximum of two primary colors and black; however, this process has the disadvantage of requiring the existence of experimental values for determining the color inks and black ink proportions.

U.S. Pat. No. 4,908,712 discloses a method for reproduction of a multi-tone color image by combination of chromatic inks of cyan, magenta and yellow together with an achromatic ink of black. In the region of lower tone levels than a prescribed value, the image is formed by the complete under color removal (UCR), namely, by the sole use of the achromatic ink. In the region of higher tone levels than the prescribed value, the reproduction of the image is attained by performing the under color removal (UCR) at a ratio of decrease relative to the rise of the tone levels, namely by causing the chromatic inks to overlap the achromatic ink.

This U.S. Patent also has the disadvantage of requiring the existence of experimental values for determining the color inks and black ink proportions.

On the other hand, International Publication No. WO 95/27923 describes a color separation process wherein the color ink proportions and the black portion are determined without the necessity of having experimental values.

For the purpose, the invention proposes a color separation process wherein the proportions of the colors (additive mixture) are determined for each image point of the original; the color proportions of the original are converted into proportions of process inks (subtractive mixture); the value for the smallest process ink proportion is set as the value for the black portion, representing the amount of black for reproducing the image point of the original; based on the black portion the residual white portion of the image point is determined; differential process ink proportions are determined based on the difference of the previously determined process ink proportions and the black portion; the differential process ink proportions are converted to corrected process ink proportions representing the amounts of the process inks needed to reproduce the image point, the corrected process ink proportions then being equivalent to the process ink proportions which, starting from the differential process ink proportions, correspond to process ink proportions for reproduction on a completely white surface.

Although this document states that the ink proportions and the black portion are determined without necessity of having experimental values, by means of the method described therein, it is impossible to obtain a color shade without doing a color separation first, which strictly is an experimental procedure. Therefore, it is impossible also to obtain an intermediate shade in a color chart due to the fact that the color separation cannot be effected since the color shade is not shown.

As a consequence from the above, a way to supress the drawbacks of the prior art and provide a method to obtain a tabulation has been sought, by means of which an accurately reproductible color range can be represented; thus providing the necessary tools to carry out a color selection in a simple and practical manner, such as a catalogue or color chart; and also allowing, during the application of any of the printing methods, the accurate reproduction of said colors; or else, usable in any application requiring the selection and procuration of colors to be accurately reproduced.

OBJECTS OF THE INVENTION

Having in mind the drawbacks of the prior art, it is an object of this invention to provide a method for obtaining a tabulation to display a range of colors which can be reproduced with accuracy, thus obtaining a catalogue or color chart useful to select said colors in a simple and practical manner.

It is another object of this invention to provide a method for obtaining a tabulation to display a range of colors which can be reproduced with accuracy; wherein, further to obtaining a color chart, provides for the faithful reproduction of said colors, either through the plain colors or the process colors technics.

It is another further object of this invention to provide a method for obtaining a tabulation to display a range of colors which can be reproduced with accuracy, wherein the difference between color and shade is clearly shown.

The above objects as well as other further objects and advantages of the invention are obtained by a method comprising basically the obtention of a tabulation to display a range of colors which can be reproduced with accuracy, which is obtained by the application of a color volume calculated as per the following expression:

$$T=(10V)^{1/2} \tag{I}$$

wherein:
T=the color shade, as a percentage (%),
V=the color volume, in volumetric units.

DETAILED DESCRIPTION

Referring now particularly to a specific embodiment of the instant invention, the method for obtaining a tabulation to display a range of colors which can be reproduced with accuracy, and hereinbelow disclosed, basically comprises the making of a tabulation to obtain a catalogue or color chart, wherein it is possible to select, obtain and level colors, starting with the application of a mathematical expression to be defined hereinbelow, through which it is obtained, by means of arithmetic calculations, a series of values for every primary color employed in the method of the present invention; which are transparent pigments of the balanced primary colors;

In a lithographic system, every paint shows to the eye a 100% of its "shade" only when the same is deposited as a film of uniform "thickness" on a white surface.

Said film thickness or height is defined as 1 ROC.

In said lithographic system, a "screen" has the property of show to the eye the same shade as a paint layer with a thickness corresponding to the percentage of said screen.

To a 100% of a screen corresponds a layer thickness of 1 ROC and to a 0 % of a screen corresponds a layer thickness of 0 ROC.

$$T=(10\ V)^{1/2} \tag{I}$$

wherein:
T=the color shade, as a percentage (%), with 0 to 100 limits;
V=the color volume, in volumetric units, with 0 to 1000 limits.

In order to obtain the catalogue or color chart by applying the method of this invention, two primary colors and a black color are employed, whereby the original colors obtained are more brilliant due to the fact that they do not comprise a white color; as well as the shade of said original colors, by employing two primary colors, black and white color.

The admixture of primary colors are carried out according to the following sequence:

1) RED COLORS

Red colors are obtained by admixing primary colors yellow and magenta.

Taking (a) as the volume of yellow color and (b) as the volume of magenta color, upon variation of each of them the following is obtained:

When (a) equals (b) a maximum binary red color is obtained.
When (a) is greater than (b), a yellowish red color is obtained.
When (b) is greater than (a), a magentish red color is obtained.

2) GREEN COLORS

Green colors are obtained by admixing primary colors yellow and cyan.

With (a) defining the volume of yellow color and (b) the volume of cyan color, upon variation in the amounts of each of them the following is obtained:

When (a) equals (b), a maximum binary green color is obtained.
When (a) is greater than (b), a yellowish green color is obtained.
When (b) is greater than (a), a cyanish green color is obtained.

3) VIOLET COLORS

Violet colors are obtained by admixing primary colors magenta and cyan.

Where (a) defines the volume of magenta color and (b) the volume of cyan color, upon variation in the amounts of each of them the following is obtained:

When (a) equals (b), a maximum binary violet color is obtained.
When (a) is greater than (b) a magentish violet color is obtained.
When (b) is greater than (a) a cyanish violet color is obtained.

The method for obtaining a tabulation to display a range of colors which can be reproduced with accuracy, according to the present invention, is initially based on the combination of the three primary colors, namely, yellow, magenta and cyan, to obtain a 100% color; and thereafter to obtain said 100% color by employing the method of the present invention, but by admixing only two primary colors and black color.

To the thus obtained color it is added white color to scale the same and to obtain the shade of the original color. This means, at an industrial level, considerable savings, since, in this manner, only two pigments of said two primary colors are used, instead of the three pigments corresponding to said three primary colors.

The method for obtaining a tabulation to display a range of colors which can be reproduced with accuracy, of the present invention, basically comprises the following steps:

1) Defining a 100% color, constituted by the combination of the primary colors yellow, magenta and cyan, by selecting the percentage of the shades of every color in the primary colors combination.

2) Obtaining the volumes equivalent to said three primary colors constituting a required color shade, by applying the equation:

$$V = T^2/10 \tag{II}$$

3) The color volumes obtained above in step 2), are added to each other and the percentage of each is obtained. A reference value is determined for the total volume, and said value can be 1, 10, 100, 1000, etc., preferably 1000, and the obtained percentages are applied thereto.

4) The lower volume obtained above in step 3) is taken as a reference and equal volumes of said other two primary colors are taken.

5) The grey color is determined, as the equivalent for a mixture of equal volumes of said three primary colors in the previous step.

In order to obtain the grey equivalent of the mixture of equal volumes of said three primary colors, it has been surprisingly found by means of the experiments that a cyan color at 100% of shade, passes a 75% of light and retains a 25% of light; magenta color at 100% of shade passes a 50% of light and retains a 50% of light; and yellow color at 100% of shade passes a 25% of light and retains a 75% of light.

With these experimental data, the volume of black color equivalent, retaining a 25% of light for cyan color, the volume of black color equivalent, retaining a 50% of light for magenta color and the volume of black color retaining a 75% of light for yellow color are calculated by applying the above equation (II).

Once the black color volumes have been obtained for each of the primary colors, each of the volumes of black color is complemented with the volume of white color required to obtain a 100% of volume.

Black color and white color volumes thus found, upon admixing them, correspond to the gray colors equivalent for every primary color.

Black color volumes and white color volumes, corresponding to each of the primary colors, are grouped and added in such a manner as to obtain the percentage volume of black color and the percentage volume of white color corresponding to the gray color equivalent for the mixture of said three primary colors in equal volumes.

6) The equal volumes of said three primary colors, as obtained in step 4 are added and then multiplied by the percentage volume of black color and the percentage volume of white color, as obtained in step 5), in order to obtain the corresponding gray volume equivalent.

In this manner, the mixture of said three primary colors from step 1 has been reduced into two primary colors and gray equivalent corresponding to the mixture of equal volumes of said three primary colors, as obtained in step 4).

7) The volume of white color is substracted from gray equivalent in such a manner, that the volumes of the mixture in previous step 6) are reduced into two primary colors and black color. Thus the total volume of the mixture and the percentage of each of the colors thereof are obtained, whereby the amounts of said two primary colors and black color in said mixture is defined.

The volume values thus obtained correspond to the color at 100% of the selection of color shades for said three primary colors in step (1), without the inclusion of the white color volume.

8) Applying Equation I to the volume values as found in step 7), in order to determine the percentage of shade for said two primary colors and black color.

9) Establishing a percentage of color shade.

10) Obtaining the volume corresponding to the color shade selected by applying Equation II, taken as a basis a total reference volume, which can be 1, 10, 100, 1000, etc., preferably 1000, in such a manner, that the white color volume present in the mixture is determined by complement.

11) Obtaining the amounts of said two primary colors and black color in said mixture in the previous step, by employing the percentage values for each of the colors, as obtained in step 7).

12) Adding the white color volume and the major primary color volume obtained under 11) above. The reciprocal value for the volume thus obtained is calculated, and multiplied by the reference volume, so as to obtain a factor that will remain constant.

13) The white color volume obtained under step 10) above and the volumes of said two primary colors and black color, as obtained under 11) above, are multiplied by the factor obtained in previous step 12), thus obtaining the final volumes of black, white and said two primary colors. p1 14) Obtaining the equivalent shades of said two volumes of primary colors and the volume of black color from the previous step, by applying said formula (I).

15) Finally, tabulating the thus obtained result from the previous step, and repeating said method as many times as necessary.

The method of the instant invention is applied to different initial combinations of said three primary colors yellow (A), magenta (M) and cyan (C), and ending with a reduction of the combination of said primary colors, into a combination of two primary colors and black (N) color, according to the above:

| INITIAL COMBINATION | FINAL COMBINATION |
| --- | --- |
| (1) A + M + C | A + M + N |
| (2) M + A + C | M + A + N |
| (3) A + C + M | A + C + N |
| (4) C + A + M | C + A + N |
| (5) M + C + A | M + C + N |
| (6) C + M + A | C + M + N |

An example is shown in Table 1 of the different tabulations obtained by following the above disclosed procedure and with the use of said three primary colors [yellow (A)+magenta (M)+cyan (C)] from the first or initial combination, and with a final reduction of said color combination into two primary colors and black [yellow (A)+magenta (M)+black (N)].

For combinations of the primary colors (2) through (6), tabulations similar to those appearing in Table 1 are effected, by applying the method of this invention.

TABLE 1

| | 100 | 90 | 80 | 70 | 60 | 50 |
|---|---|---|---|---|---|---|
| A100 + M10 + C1 | A100 + M10 + N0 | A90 + M10 + N0 | A80 + M10 + N0 | A70 + M5 + N0 | A60 + M5 + N0 | A50 + M5 + N0 |
| A100 + M10 + C2 | A100 + M10 + N0 | A90 + M10 + N0 | A80 + M10 + N0 | A70 + M5 + N0 | A60 + M5 + N0 | A50 + M5 + N0 |
| A100 + M10 + C3 | A100 + M10 + N5 | A90 + M10 + N5 | A80 + M5 + N0 | A70 + M5 + N0 | A60 + M5 + N0 | A50 + M5 + N0 |
| A100 + M10 + C4 | A100 + M10 + N5 | A90 + M10 + N5 | A80 + M5 + N5 | A70 + M5 + N5 | A60 + M5 + N5 | A50 + M5 + N5 |
| A100 + M10 + C5 | A100 + M10 + N5 | A90 + M5 + N5 | A80 + M5 + N5 | A70 + M5 + N5 | A60 + M5 + N5 | A50 + M5 + N5 |
| A100 + M10 + C6 | A100 + M5 + N5 | A90 + M5 + N5 | A80 + M5 + N5 | A70 + M5 + N5 | A60 + M5 + N5 | A50 + M5 + N5 |
| A100 + M10 + C7 | A100 + M5 + N5 | A90 + M5 + N5 | A80 + M5 + N5 | A70 + M5 + N5 | A60 + M5 + N5 | A50 + M5 + N5 |
| A100 + M10 + C8 | A100 + M5 + N10 | A90 + M5 + N10 | A80 + M5 + N5 | A70 + M5 + N5 | A60 + M5 + N5 | A50 + M5 + N5 |
| A100 + M10 + C9 | A100 + M5 + N10 | A90 + M5 + N10 | A80 + M5 + N5 | A70 + M5 + N5 | A60 + M5 + N5 | A50 + M0 + N5 |
| A100 + M10 + C10 | A100 + M20 + N0 | A90 + M20 + N0 | A80 + M15 + N0 | A70 + M15 + N0 | A60 + M10 + N0 | A50 + M10 + N0 |
| A100 + M20 + C2 | A100 + M20 + N0 | A90 + M20 + N0 | A80 + M15 + N0 | A70 + M15 + N0 | A60 + M10 + N0 | A50 + M10 + N0 |
| A100 + M20 + C4 | A100 + M20 + N5 | A90 + M20 + N5 | A80 + M15 + N5 | A70 + M15 + N5 | A60 + M10 + N5 | A50 + M10 + N5 |
| A100 + M20 + C6 | A100 + M20 + N5 | A90 + M15 + N5 | A80 + M15 + N5 | A70 + M10 + N5 | A60 + M10 + N5 | A50 + M10 + N5 |
| A100 + M20 + C8 | A100 + M15 + N10 | A90 + M15 + N10 | A80 + M15 + N10 | A70 + M10 + N10 | A60 + M10 + N10 | A50 + M10 + N10 |
| A100 + M20 + C10 | A100 + M15 + N10 | A90 + M15 + N10 | A80 + M15 + N10 | A70 + M10 + N10 | A60 + M10 + N10 | A50 + M10 + N10 |
| A100 + M20 + C12 | A100 + M15 + N10 | A90 + M15 + N10 | A80 + M15 + N10 | A70 + M10 + N10 | A60 + M10 + N10 | A50 + M10 + N10 |
| A100 + M20 + C14 | A100 + M10 + N15 | A90 + M10 + N15 | A80 + M10 + N10 | A70 + M10 + N10 | A60 + M10 + N10 | A50 + M5 + N10 |
| A100 + M20 + C16 | A100 + M10 + N15 | A90 + M10 + N15 | A80 + M5 + N15 | A70 + M5 + N10 | A60 + M5 + N10 | A50 + M5 + N10 |
| A100 + M20 + C18 | A100 + M0 + N20 | A90 + M0 + N15 | A80 + M0 + N15 | A70 + M0 + N15 | A60 + M0 + N10 | A50 + M0 + N10 |
| A100 + M20 + C20 | A100 + M30 + N5 | A90 + M25 + N5 | A80 + M25 + N5 | A70 + M20 + N5 | A60 + M15 + N5 | A50 + M15 + N5 |
| A100 + M30 + C3 | A100 + M30 + N5 | A90 + M25 + N5 | A80 + M25 + N5 | A70 + M20 + N5 | A60 + M15 + N5 | A50 + M15 + N5 |
| A100 + M30 + C6 | A100 + M30 + N10 | A90 + M25 + N10 | A80 + M20 + N10 | A70 + M20 + N10 | A60 + M15 + N10 | A50 + M15 + N5 |
| A100 + M30 + C9 | A100 + M25 + N15 | A90 + M25 + N15 | A80 + M20 + N15 | A70 + M20 + N10 | A60 + M15 + N10 | A50 + M10 + N10 |
| A100 + M30 + C12 | A100 + M25 + N15 | A90 + M20 + N20 | A80 + M20 + N15 | A70 + M15 + N15 | A60 + M15 + N10 | A50 + M10 + N10 |
| A100 + M30 + C15 | A100 + M20 + N20 | A90 + M20 + N20 | A80 + M20 + N20 | A70 + M15 + N20 | A60 + M15 + N15 | A50 + M10 + N15 |
| A100 + M30 + C18 | A100 + M20 + N25 | A90 + M15 + N25 | A80 + M15 + N20 | A70 + M15 + N20 | A60 + M10 + N15 | A50 + M10 + N15 |
| A100 + M30 + C21 | A100 + M20 + N25 | A90 + M15 + N25 | A80 + M15 + N20 | A70 + M15 + N20 | A60 + M10 + N15 | A50 + M10 + N15 |
| A100 + M30 + C24 | A100 + M15 + N25 | A90 + M15 + N20 | A80 + M10 + N20 | A70 + M10 + N20 | A60 + M10 + N15 | A50 + M5 + N15 |
| A100 + M30 + C27 | A100 + M15 + N25 | A90 + M10 + N25 | A80 + M10 + N25 | A70 + M10 + N20 | A60 + M5 + N20 | A50 + M5 + N15 |
| A100 + M30 + C30 | A100 + M0 + N30 | A90 + M0 + N25 | A80 + M0 + N25 | A70 + M0 + N20 | A60 + M0 + N15 | A50 + M0 + N15 |
| A100 + M40 + C4 | A100 + M40 + N5 | A90 + M35 + N5 | A80 + M30 + N5 | A70 + M25 + N5 | A60 + M25 + N5 | A50 + M20 + N0 |
| A100 + M40 + C8 | A100 + M40 + N10 | A90 + M35 + N10 | A80 + M30 + N10 | A70 + M25 + N10 | A60 + M20 + N5 | A50 + M20 + N5 |
| A100 + M40 + C12 | A100 + M35 + N15 | A90 + M35 + N15 | A80 + M25 + N15 | A70 + M25 + N10 | A60 + M20 + N10 | A50 + M15 + N5 |
| A100 + M40 + C16 | A100 + M35 + N20 | A90 + M30 + N20 | A80 + M25 + N20 | A70 + M20 + N15 | A60 + M20 + N15 | A50 + M15 + N10 |
| A100 + M40 + C20 | A100 + M30 + N25 | A90 + M25 + N25 | A80 + M25 + N20 | A70 + M20 + N15 | A60 + M20 + N15 | A50 + M15 + N10 |
| A100 + M40 + C24 | A100 + M25 + N25 | A90 + M25 + N25 | A80 + M20 + N20 | A70 + M20 + N20 | A60 + M15 + N15 | A50 + M15 + N10 |
| A100 + M40 + C28 | A100 + M20 + N30 | A90 + M20 + N30 | A80 + M20 + N25 | A70 + M15 + N25 | A60 + M15 + N20 | A50 + M10 + N15 |
| A100 + M40 + C32 | A100 + M20 + N30 | A90 + M15 + N30 | A80 + M15 + N25 | A70 + M15 + N20 | A60 + M10 + N20 | A50 + M10 + N15 |
| A100 + M40 + C36 | A100 + M15 + N35 | A90 + M15 + N30 | A80 + M15 + N30 | A70 + M10 + N25 | A60 + M10 + N20 | A50 + M10 + N15 |
| A100 + M40 + C40 | A100 + M0 + N40 | A90 + M0 + N35 | A80 + M0 + N30 | A70 + M0 + N25 | A60 + M0 + N25 | A50 + M0 + N20 |
| A100 + M50 + C5 | A100 + M50 + N10 | A90 + M45 + N5 | A80 + M40 + N5 | A65 + M35 + N5 | A55 + M30 + N5 | A45 + M25 + N5 |
| A100 + M50 + C10 | A100 + M50 + N10 | A90 + M45 + N10 | A80 + M35 + N10 | A65 + M30 + N10 | A55 + M25 + N5 | A45 + M20 + N5 |
| A100 + M50 + C15 | A100 + M45 + N15 | A90 + M40 + N15 | A80 + M35 + N15 | A65 + M30 + N15 | A55 + M25 + N10 | A45 + M20 + N10 |
| A100 + M50 + C20 | A100 + M45 + N20 | A90 + M40 + N20 | A80 + M35 + N20 | A65 + M25 + N20 | A55 + M25 + N10 | A45 + M20 + N10 |
| A100 + M50 + C25 | A100 + M40 + N25 | A90 + M35 + N20 | A80 + M30 + N20 | A65 + M25 + N20 | A55 + M20 + N15 | A45 + M15 + N15 |
| A100 + M50 + C30 | A100 + M40 + N30 | A90 + M35 + N25 | A80 + M30 + N25 | A65 + M25 + N20 | A55 + M20 + N15 | A45 + M15 + N15 |
| A100 + M50 + C35 | A100 + M35 + N30 | A90 + M30 + N30 | A80 + M25 + N25 | A65 + M20 + N25 | A55 + M20 + N20 | A45 + M15 + N15 |
| A100 + M50 + C40 | A100 + M25 + N35 | A90 + M30 + N30 | A80 + M25 + N30 | A65 + M15 + N25 | A55 + M25 + N20 | A45 + M15 + N20 |
| A100 + M50 + C45 | A100 + M25 + N40 | A90 + M25 + N35 | A80 + M20 + N30 | A65 + M15 + N25 | A55 + M25 + N20 | A45 + M10 + N15 |
| A100 + M50 + C45 | A100 + M25 + N45 | A90 + M20 + N40 | A80 + M20 + N35 | A65 + M15 + N25 | A55 + M25 + N25 | A45 + M10 + N20 |

TABLE 1-continued

| | | | | |
|---|---|---|---|---|
| A100 + M50 + C50 | A100 + M0 + N55 | A90 + M0 + N45 | A80 + M0 + N40 | A65 + M0 + N35 | A55 + M0 + N30 | A45 + M0 + N25 |
| A100 + M60 + C6 | A100 + M60 + N10 | A85 + M50 + N5 | A75 + M45 + N5 | A65 + M40 + N5 | A55 + M30 + N5 | A45 + M30 + N0 |
| A100 + M60 + C12 | A100 + M60 + N15 | A85 + M50 + N10 | A75 + M45 + N10 | A65 + M35 + N10 | A55 + M30 + N10 | A45 + M30 + N5 |
| A100 + M60 + C18 | A100 + M60 + N20 | A85 + M50 + N15 | A75 + M45 + N15 | A65 + M35 + N15 | A55 + M30 + N15 | A45 + M30 + N10 |
| A100 + M60 + C24 | A100 + M60 + N25 | A85 + M45 + N20 | A75 + M40 + N20 | A65 + M35 + N20 | A55 + M30 + N20 | A45 + M30 + N10 |
| A100 + M60 + C30 | A100 + M55 + N30 | A85 + M45 + N25 | A75 + M40 + N25 | A65 + M30 + N25 | A55 + M25 + N25 | A45 + M30 + N15 |
| A100 + M60 + C36 | A100 + M50 + N35 | A85 + M40 + N30 | A75 + M35 + N30 | A65 + M30 + N30 | A55 + M25 + N20 | A45 + M30 + N15 |
| A100 + M60 + C42 | A100 + M45 + N45 | A85 + M40 + N40 | A75 + M35 + N35 | A65 + M25 + N30 | A55 + M20 + N20 | A45 + M20 + N20 |
| A100 + M60 + C48 | A100 + M40 + N50 | A85 + M35 + N45 | A75 + M30 + N40 | A65 + M25 + N35 | A55 + M20 + N20 | A45 + M20 + N20 |
| A100 + M60 + C54 | A100 + M30 + N60 | A85 + M25 + N50 | A75 + M25 + N45 | A65 + M20 + N40 | A55 + M15 + N30 | A45 + M15 + N25 |
| A100 + M60 + C60 | A100 + M0 + N70 | A85 + M0 + N60 | A75 + M0 + N50 | A65 + M0 + N45 | A50 + M0 + N35 | 45 + M15 + N25 |
| A100 + M70 + C7 | A100 + M70 + N5 | A85 + M60 + N5 | A75 + M50 + N5 | A65 + M45 + N5 | A50 + M35 + N5 | A50 + M0 + N30 |
| A100 + M70 + C14 | A100 + M70 + N15 | A85 + M60 + N10 | A75 + M50 + N10 | A65 + M45 + N10 | A50 + M35 + N5 | A45 + M30 + N5 |
| A100 + M70 + C21 | A100 + M70 + N20 | A85 + M60 + N15 | A75 + M50 + N15 | A60 + M45 + N15 | A50 + M35 + N10 | A45 + M30 + N5 |
| A100 + M70 + C28 | A100 + M65 + N25 | A85 + M55 + N25 | A75 + M50 + N20 | A60 + M40 + N20 | A50 + M35 + N15 | A45 + M30 + N10 |
| A100 + M70 + C35 | A100 + M65 + N30 | A85 + M55 + N30 | A75 + M45 + N25 | A60 + M40 + N25 | A50 + M30 + N20 | A40 + M30 + N15 |
| A100 + M70 + C42 | A100 + M60 + N45 | A85 + M50 + N45 | A75 + M40 + N30 | A60 + M35 + N30 | A50 + M30 + N25 | A40 + M25 + N20 |
| A100 + M70 + C49 | A100 + M55 + N55 | A85 + M50 + N45 | A70 + M40 + N40 | A60 + M35 + N35 | A50 + M30 + N25 | A40 + M25 + N20 |
| A100 + M70 + C56 | A100 + M50 + N65 | A85 + M45 + N55 | A70 + M35 + N45 | A60 + M30 + N40 | A50 + M25 + N30 | A40 + M25 + N20 |
| A100 + M70 + C63 | A100 + M40 + N75 | A85 + M35 + N65 | A70 + M30 + N55 | A60 + M25 + N45 | A50 + M20 + N35 | A40 + M15 + N30 |
| A100 + M70 + C70 | A100 + M0 + N90 | A85 + M0 + N75 | A70 + M0 + N65 | A60 + M0 + N55 | A50 + M0 + N40 | A40 + M0 + N35 |
| A100 + M80 + C8 | A100 + M80 + N10 | A85 + M70 + N5 | A70 + M55 + N5 | A60 + M50 + N5 | A40 + M40 + N5 | A40 + M35 + N5 |
| A100 + M80 + C16 | A100 + M80 + N15 | A85 + M70 + N10 | A70 + M55 + N10 | A60 + M50 + N10 | A40 + M40 + N10 | A40 + M35 + N10 |
| A100 + M80 + C24 | A100 + M80 + N25 | A85 + M65 + N20 | A70 + M55 + N15 | A60 + M45 + N15 | A40 + M40 + N15 | A40 + M30 + N10 |
| A100 + M80 + C32 | A100 + M75 + N30 | A85 + M65 + N25 | A70 + M55 + N20 | A60 + M45 + N20 | A40 + M35 + N20 | A40 + M30 + N15 |
| A100 + M80 + C40 | A100 + M75 + N40 | A85 + M60 + N35 | A70 + M50 + N30 | A60 + M45 + N25 | A40 + M35 + N20 | A40 + M30 + N15 |
| A100 + M80 + C48 | A100 + M70 + N50 | A85 + M60 + N45 | A70 + M50 + N40 | A60 + M40 + N30 | A40 + M35 + N20 | A40 + M30 + N20 |
| A100 + M80 + C56 | A100 + M70 + N65 | A85 + M55 + N55 | A70 + M50 + N45 | A60 + M40 + N35 | A40 + M35 + N25 | A40 + M25 + N25 |
| A100 + M80 + C63 | A100 + M60 + N80 | A85 + M50 + N65 | A70 + M45 + N55 | A55 + M35 + N45 | A45 + M30 + N30 | A40 + M25 + N30 |
| A100 + M80 + C72 | A100 + M60 + N95 | A80 + M40 + N80 | A70 + M35 + N65 | A50 + M30 + N55 | A45 + M25 + N35 | A40 + M20 + N35 |
| A100 + M80 + C80 | A100 + M0 + N100 | A80 + M0 + N85 | A65 + M0 + N70 | A50 + M0 + N60 | A40 + M0 + N40 | A35 + M0 + N40 |
| A100 + M90 + C9 | A80 + M0 + N100 | A70 + M0 + N85 | A60 + M0 + N70 | A50 + M0 + N60 | A40 + M0 + N50 | A40 + M35 + N5 |
| A100 + M90 + C18 | A100 + M90 + N10 | A85 + M75 + N15 | A70 + M65 + N10 | A60 + M55 + N10 | A50 + M45 + N5 | A40 + M35 + N10 |
| A100 + M90 + C24 | A100 + M90 + N15 | A85 + M75 + N20 | A70 + M65 + N15 | A60 + M55 + N15 | A50 + M45 + N10 | A40 + M35 + N10 |
| A100 + M90 + C32 | A100 + M90 + N25 | A85 + M70 + N30 | A70 + M60 + N20 | A60 + M50 + N20 | A50 + M45 + N15 | A40 + M35 + N15 |
| A100 + M90 + C45 | A100 + M90 + N35 | A85 + M70 + N35 | A70 + M60 + N25 | A60 + M50 + N25 | A50 + M40 + N15 | A40 + M35 + N15 |
| A100 + M90 + C54 | A100 + M85 + N45 | A85 + M65 + N45 | A70 + M60 + N30 | A60 + M50 + N30 | A50 + M40 + N20 | A40 + M35 + N20 |
| A100 + M90 + C63 | A100 + M85 + N60 | A80 + M60 + N55 | A70 + M60 + N40 | A60 + M45 + N35 | A45 + M35 + N20 | A40 + M30 + N20 |
| A100 + M90 + C72 | A100 + M85 + N75 | A80 + M60 + N65 | A70 + M55 + N50 | A55 + M40 + N45 | A45 + M35 + N25 | A40 + M25 + N25 |
| A100 + M90 + C81 | A100 + M80 + N85 | A80 + M60 + N75 | A70 + M50 + N60 | A55 + M40 + N55 | A45 + M35 + N30 | A35 + M30 + N25 |
| A100 + M90 + C90 | A75 + M75 + N100 | A75 + M0 + N90 | A60 + M0 + N75 | A55 + M0 + N65 | A45 + M0 + N50 | A35 + M30 + N30 |
| A100 + M100 + C10 | A100 + M100 + N20 | A80 + M80 + N10 | A70 + M70 + N10 | A55 + M55 + N10 | A45 + M45 + N5 | A35 + M35 + N10 |
| A100 + M100 + C20 | A100 + M100 + N20 | A80 + M80 + N15 | A70 + M70 + N15 | A55 + M55 + N15 | A45 + M45 + N10 | A35 + M35 + N10 |
| A100 + M100 + C30 | A100 + M100 + N30 | A80 + M80 + N25 | A70 + M70 + N20 | A55 + M55 + N20 | A45 + M45 + N15 | A35 + M35 + N15 |
| A100 + M100 + C40 | A100 + M100 + N40 | A80 + M80 + N35 | A65 + M65 + N25 | A55 + M55 + N25 | A45 + M45 + N20 | A35 + M35 + N20 |
| A100 + M100 + C50 | A100 + M100 + N50 | A80 + M80 + N45 | A65 + M65 + N30 | A55 + M55 + N30 | A45 + M45 + N20 | A35 + M35 + N20 |
| A100 + M100 + C60 | A100 + M100 + N55 | A80 + M80 + N55 | A65 + M65 + N40 | A55 + M55 + N35 | A45 + M45 + N25 | A35 + M35 + N25 |
| A100 + M100 + C70 | A100 + M100 + N70 | A75 + M75 + N70 | A65 + M60 + N50 | A50 + M50 + N45 | A45 + M45 + N30 | A35 + M35 + N30 |
| A100 + M100 + C80 | A100 + M100 + N90 | A70 + M70 + N80 | A60 + M60 + N55 | A50 + M50 + N55 | A35 + M35 + N40 | A30 + M30 + N30 |
| A100 + M100 + C90 | A80 + M60 + N90 | A65 + M65 + N95 | A55 + M55 + N60 | A45 + M45 + N55 | A35 + M35 + N45 | A30 + M30 + N35 |
| A100 + M100 + C100 | A100 + M100 + N100 | A60 + M60 + N100 | A55 + M55 + N75 | A45 + M45 + N65 | A35 + M35 + N50 | A30 + M30 + N35 |
| A80 + M0 + C80 | A80 + M0 + N100 | A45 + M0 + N90 | A40 + M0 + N75 | A35 + M0 + N65 | A30 + M0 + N45 | A20 + M20 + N35 |
| A50 + M60 + C90 | A50 + M50 + N100 | A45 + M45 + N100 | A45 + M45 + N85 | A25 + M25 + N60 | A25 + M25 + N50 | A0 + M0 + N50 |
| A0 + M0 + C100 | A0 + M0 + N100 | A0 + M0 + N90 | A0 + M0 + N80 | A0 + M0 + N70 | A0 + M0 + N60 | A0 + M0 + N50 |

TABLE 1-continued

| 40 | 30 | 20 | 10 |
|---|---|---|---|
| A35 + M20 + N0 | A25 + M15 + N0 | A15 + M10 + N0 | A10 + M5 + N0 |
| A35 + M20 + N5 | A25 + M15 + N5 | A15 + M10 + N0 | A10 + M5 + N0 |
| A35 + M20 + N10 | A25 + M15 + N10 | A15 + M10 + N5 | A10 + M5 + N0 |
| A35 + M20 + N15 | A25 + M15 + N10 | A15 + M10 + N5 | A10 + M5 + N0 |
| A35 + M20 + N20 | A25 + M15 + N15 | A15 + M10 + N5 | A10 + M5 + N0 |
| A35 + M15 + N15 | A25 + M10 + N15 | A15 + M5 + N10 | A10 + M5 + N5 |
| A35 + M15 + N20 | A25 + M10 + N20 | A15 + M5 + N10 | A10 + M5 + N5 |
| A35 + M10 + N20 | A25 + M0 + N15 | A15 + M0 + N10 | A10 + M0 + N5 |
| A35 + M0 + N25 | A25 + M15 + N0 | A15 + M10 + N0 | A10 + M5 + N0 |
| A35 + M25 + N0 | A25 + M15 + N5 | A15 + M10 + N5 | A10 + M5 + N5 |
| A35 + M25 + N5 | A25 + M15 + N5 | A15 + M10 + N5 | A10 + M5 + N0 |
| A35 + M20 + N5 | A25 + M15 + N5 | A15 + M10 + N5 | A10 + M5 + N0 |
| A35 + M20 + N10 | A25 + M15 + N10 | A15 + M10 + N5 | A10 + M5 + N5 |
| A35 + M15 + N15 | A25 + M15 + N15 | A15 + M10 + N10 | A10 + M5 + N5 |
| A30 + M10 + N25 | A25 + M10 + N20 | A15 + M5 + N15 | A5 + M0 + N5 |
| A30 + M0 + N30 | A25 + M0 + N25 | A15 + M0 + N15 | A10 + M5 + N0 |
| A30 + M25 + N5 | A25 + M20 + N0 | A15 + M15 + N0 | A10 + M5 + N0 |
| A30 + M25 + N5 | A25 + M20 + N5 | A15 + M15 + N0 | A10 + M5 + N0 |
| A30 + M25 + N10 | A20 + M20 + N5 | A15 + M15 + N5 | A5 + M5 + N5 |
| A30 + M25 + N15 | A20 + M20 + N10 | A15 + M15 + N5 | A5 + M5 + N5 |
| A30 + M25 + N15 | A20 + M20 + N10 | A15 + M15 + N5 | A5 + M5 + N5 |
| A30 + M20 + N20 | A20 + M15 + N15 | A15 + M10 + N10 | A5 + M5 + N5 |
| A30 + M20 + N25 | A20 + M15 + N20 | A15 + M10 + N10 | A5 + M5 + N5 |
| A30 + M15 + N25 | A20 + M10 + N20 | A15 + M10 + N10 | A5 + M5 + N5 |
| A25 + M15 + N30 | A15 + M10 + N20 | A10 + M10 + N15 | A5 + M5 + N10 |
| A25 + M0 + N35 | A15 + M0 + N25 | A10 + M0 + N20 | A5 + M0 + N10 |
| A30 + M30 + N5 | A20 + M20 + N0 | A15 + M15 + N0 | A5 + M5 + N0 |
| A30 + M30 + N5 | A20 + M20 + N5 | A15 + M15 + N5 | A5 + M5 + N0 |
| A30 + M30 + N10 | A20 + M20 + N5 | A15 + M15 + N5 | A5 + M5 + N5 |
| A30 + M30 + N15 | A20 + M20 + N10 | A15 + M15 + N5 | A5 + M5 + N5 |
| A25 + M25 + N20 | A20 + M20 + N15 | A15 + M15 + N10 | A5 + M5 + N10 |
| A25 + M25 + N25 | A20 + M15 + N20 | A15 + M10 + N15 | A5 + M5 + N5 |
| A20 + M25 + N30 | A15 + M15 + N20 | A10 + M10 + N15 | A5 + M5 + N10 |
| A20 + M20 + N35 | A15 + M0 + N25 | A10 + M0 + N20 | A5 + M0 + N10 |
| A30 + M30 + N5 | A20 + M20 + N5 | A15 + M15 + N5 | A5 + M5 + N0 |
| A30 + M30 + N10 | A20 + M20 + N5 | A15 + M15 + N5 | A5 + M5 + N5 |
| A30 + M30 + N15 | A20 + M20 + N10 | A15 + M15 + N5 | A5 + M5 + N5 |
| A25 + M25 + N20 | A20 + M20 + N15 | A15 + M15 + N10 | A5 + M5 + N10 |
| A25 + M25 + N25 | A20 + M20 + N20 | A15 + M15 + N15 | A5 + M5 + N10 |
| A25 + M25 + N20 | A20 + M20 + N15 | A15 + M15 + N10 | A5 + M5 + N5 |
| A25 + M25 + N20 | A20 + M20 + N15 | A15 + M15 + N10 | A5 + M5 + N5 |
| A25 + M25 + N20 | A20 + M20 + N15 | A15 + M15 + N10 | A5 + M5 + N5 |

TABLE 1-continued

| | | | |
|---|---|---|---|
| A25 + M25 + N25 | A20 + M20 + N15 | A10 + M10 + N10 | A5 + M5 + N5 |
| A20 + M20 + N30 | A15 + M15 + N20 | A10 + M10 + N15 | A5 + M5 + N5 |
| A15 + M15 + N35 | A15 + M15 + N25 | A10 + M10 + N15 | A5 + M5 + N10 |
| A0 + M0 + N40 | A0 + M0 + N30 | A0 + M0 + N20 | A0 + M0 + N10 |

In Table 1, first column, the different combination of the required color shades are shown, there being represented yellow color with "A"; magenta color with "M" and cyan color with "C".

At the second column the values obtained through the already described procedure are shown, with one of said two primary colors being reported to the 100% of shade, thus making it the main primary color; with the values obtained for the second primary color being also stated, as well as for black color, represented by an "N".

The values obtained through the procedure of the present invention are shown at the third column, with the values obtained to 90% of the main primary color shade being reported, as well as the values obtained for the second primary color and also for black color.

In fourth column the values obtained through the procedure of the instant invention are shown, with the values obtained to 80% of the main primary color shade being stated, as well as the values obtained for the second primary color and also for black color.

The values obtained through the procedure of the present invention are shown at fifth column, with the values obtained to 70% of the main primary color shade being indicated, as well as the values obtained for the second primary color and also for black color.

In sixth column appear the values obtained through the procedure of the present invention, with the values obtained to 60% of the main primary color shade being shown as well as the values obtained for the second primary color and also for black color.

Under seventh column appear the values obtained through the procedure of the instant invention, with the values obtained to 50% of the main primary color shade being stated as well as the values obtained for the second primary color and also for black color.

Eighth column shows the values obtained through the procedure of the present invention, with the values obtained to 40% of the main primary color shade being indicated as well as the values obtained for the second primary color and also for black color.

On nineth column the values obtained through the procedure of the present invention were stated, with the values obtained to 30% of the main primary color tone being indicated as well as the values obtained for the second primary color and also for black color.

In tenth column appear the values obtained through the procedure of the present invention, with the values obtained to 20% of the main primary color shade being shown as well as the values obtained for the second primary color and also for black color.

Under eleventh column appear the values obtained through the procedure of the instant invention, with the values obtained to 10% of the main primary color shade being stated as well as the values obtained for the second primary color and also for black color.

With the thus obtained tabulations the catalogue or color chart can be formed, comprised of rectangles arranged in ten rows and ten column, such as appear in the catalogue appended hereto and accompanying the present detailed disclosure.

At the base of each rectangle the values corresponding to each of color shades calculated according to Table 1 are included, as well as the identification of colors employed to form said color shade.

Rows are identified from top to bottom with letters A, B, C, D, E, F, G, H, I and J, respectively; columns are identified from left to right with numbers 100, 90, 80, 70, 60, 50, 40, 30, 20 and 10, respectively; and colors are ordered according to the following sequence:

RED COLORS (YELLOW, MAGENTA AND BLACK)

Yellowish reds (pages 1 through 10).

On first column of pages 1 to 10 rectangles are shown corresponding to 100 colors to 100% of yellow color shade (10 per page and per column).

From second to tenth columns of said pages 1 through 10, rectangles are shown corresponding to 900 tones of color (90 per page, 10 per column). Every column corresponds to a different yellow color shade, namely: 90% shade, 80% shade, 70% shade, 60% shade, 50% shade, 40% shade, 30% shade, 20% shade and 10% shade, respectively.

Magentish reds (pages 11 through 20).

On the first column of said pages 11 through 20 rectangles are shown corresponding to 100 colors to 100% of magenta color shade (10 colors per page and per column).

From second to tenth columns in said pages 11 through 20, rectangles are shown corresponding to 900 color shades (90 color shades per page and 10 per column). Every column corresponds to a different magenta color shade, namely: 90% shade, 80% shade, 70% shade, 60% shade, 50% shade, 40% shade, 30% shade, 20% shade and 10% shade, respectively.

GREEN COLORS (YELLOW, CYAN AND BLACK)

Yellowish greens (pages 21 through 30)

On the first column of pages 21 through 30 rectangles are shown of 100 colors to 100% of yellow color shade (10 colors per page and per column).

From second to tenth columns of every page 21 through 30, rectangles are shown corresponding to 900 color shades (90 color shades per page and 10 per column. Every column corresponds to a different yellow color shade, namely: 90% shade, 80% shade, 70% shade, 60% shade, 50% shade, 40% shade, 30% shade, 20% shade and 10% shade, respectively.

Cyanish greens (pages 31 through 40).

On the first column of said pages 31 through 40 rectangles are shown corresponding to 100 colors to 100% of cyan color shade (10 colors per page and per column).

From second to tenth columns in said pages 31 through 40, rectangles are shown corresponding to 900 color shades (90 color shades per page and 10 per column). Every column corresponds to a different cyan color shade, namely: 90% shade, 80% shade, 70% shade, 60% shade, 50% shade, 40% shade, 30% shade, 20% shade and 10% shade, respectively.

VIOLET COLORS (MAGENTA, CYAN AND BLACK)

Magentish violets (pages 41 through 50).

On the first column of pages 41 through 50 rectangles are shown of 100 colors to 100% of magenta color shade (10 colors per page and per column).

From second to tenth columns in pages 41 through 50, rectangles are shown corresponding to 900 color shades (90 color shades per page and 10 per column). Every column corresponds to a different magenta color shade, namely: 90% shade, 80% shade, 70% shade, 60% shade, 50% shade, 40% shade, 30% shade, 20% shade and 10% shade, respectively.

Cyanish violets (pages 51 through 60)

On first column of pages 51 through 60 rectangles are shown of 100 colors to 100% of cyan color shade (10 colors per page and per column).

From second to tenth columns in pages 51 through 60, rectangles are shown corresponding to 900 color shades (90 color shades per page and 10 per column). Every column corresponds to a different cyan color shade, namely: 90% shade, 80% shade, 70% shade, 60% shade, 50 % shade, 40% shade, 30% shade, 20% shade and 10% shade, respectively.

In accordance with the above description, it can be observed that with the catalogue or color chart obtained by means of the method of the present invention, a clear difference can be shown between a COLOR and a SHADE; since, for the first time, a color chart has been obtained that follows an accurate and mathematically defined pattern, for which a method is applied comprising basically the obtaining of the required color by applying a color volume, calculated as a function of the mathematical expression (I) previously herein defined; and this secures the following:

a) Should a usuary of some color printing made by means of screens comes to a designer or printer with a sample of a "COLOR" whatsoever, said color will be contained and accurately defined in any of the pages of the color chart, wherein at lest 6000 different colors are included.

b) Said "color" becomes identified by a coordinate system which personalizes and wholly identifies the same, for instance:

page 46, row "G", column "60"

Under the rectangle corresponding to said coordinates, are the values (M55+C25+N25), which means that, within the normal printing process, the selected "color" can be obtained by employing a 55% screen with magenta color, a 25% screen with cyan color and a 25% screen with black color.

c) Should, for any reason, the above mentioned color requires to be reproduced in a "plain" form, the conversion into the amounts of the corresponding pigments to be admixed in order to give the desired color, will be carried out in a very simple manner, by either employing the corresponding conversion factors, or employing a slide rule of equivalent factors, previously calculated, in such a manner that, for instance, in the example under (b) above, the following is obtained:

| Magenta | 121 parts |
| Cyan | 25 parts |
| Black | 25 parts |
| White T. | 279 parts (complement) |

Since the specific gravities among the primary colors are practically the same, the parts indicated in the above mixture could be expressed in kilograms, grams, decigrams, liters, gallons, etc.

d) Since the colors are obtained mathematically, the intermediate colors between each color shown in the color chart can be obtained, whereby the control on 6000 additional "colors" is attained.

e) The color chart obtained by applying the method of the present invention provides the control on 12000 colors (6000 colors from the original color chart and 6000 additional intermediate colors) further to the obtaining of the printing of said color either by means of "screens" or by means of "mixtures", when in a plain form.

As can be observed, the present invention is of simple, practical and economical application; being of high simplicity and easiness in the management thereof, due to the fact that, for the first time, a color chart has been obtained which follows an exact and mathematically defined pattern, by employing a method basically comprising the obtaining of the required color shade through the application of a color volume, calculated as per the mathematical expression (I).

As can be observed, the present invention is of simple, practical and economical application; being of high simplicity and easiness in the management thereof, due to the fact that, for the first time, a color chart has been obtained which follows an exact and mathematically defined pattern, by employing a method basically comprising the obtaining of the required color shade through the application of a color volume, calculated as per the mathematical expression (I).

Although a certain specific embodiment of the present invention has been illustrated and described, it is to be considered that other modifications thereto are possible, such as modify the arrangement and order of the color chart, or increase the number of colors showed in the color chart. Therefore, the present invention must not be considered as restricted except for the prior art and the spirit of the following claims.

What is claimed is:

1. A method for obtaining a tabulation to display a range of colors which can be reproduced with accuracy, comprising the following steps:

(a) selecting a percentage of color shades, in the combination of three primary colors yellow, magenta and cyan, to define a color to 100%, comprised by the combination of said three primary colors;

(b) obtaining color volumes equivalent to the percentages of the selected color shades, by applying the equation:

$$V=T^2/10 \qquad (II)$$

wherein:

T=the color shade in percentage (%); and

V=the color volume in volumetric units;

c) adding the color volumes obtained in the previous step and obtaining the percentage of each of said color volumes, by establishing a reference value of total volume, to which the thus obtained percentages are applied;

d) taking as a reference the lower volume of one of said three primary colors obtained in the previous step and taking volumes equal to that of reference for the other two of said three primary colors;

e) determining the gray color equivalent for the mixture of equal volumes of said three primary colors in the previous step;

f) adding the equal volumes of said three primary colors obtained in step (d), and multiplying the result by the % volume of black color and the % volume of white color as obtained in the previous step to obtain the corresponding gray volume equivalent, thus reducing the mixture of said three primary colors from step (a) to two of said three primary colors and the gray equivalent corresponding to the mixture of equal volumes of said three primary colors, as obtained in step (d);

(g) substracting the white color volume from the gray equivalent, so as the mixture volumes from the previous step are reduced to two said primary colors and black color; obtaining the total volume of the mixture and obtaining the percentage of each color of said two primary colors therein, thus defining the amounts of the two said primary colors and black color in the mixture; with the volume values thus obtained corresponding to said color to 100% of the color shade selection for said three primary colors from step (a) without white color;

(h) applying equation (I): $T=(10\ V)^{1/2}$ to the volume values obtained in step (g) in order to determine the percentage of shade for said two primary colors and black color;

(i) setting up a percentage of the color shade;

(j) obtaining the volume corresponding to the color shade selected by applying said equation (II); taking as a base a total reference volume, so as to determine by complement the white color volume in the mixture;

(k) obtaining the amounts of said two primary colors and black color present in the mixture from the previous step, by using the percentage values for each color of said two primary colors obtained in step (g) and determining the greater volume of said two primary colors;

(l) adding the white color volume and the greater primary color, obtained in the previous step to the volume thus obtained; calculating the reciprocal value and multiplying by the reference volume; so as to obtain a factor that will remain constant;

(m) multiplying by the factor from the previous step the volume of white color from step (j) and the volumes of said two primary colors and black color from step (i); thus obtaining the final volumes for black, white and said two primary colors;

(n) obtaining the equivalent shades of said two volumes of primary colors and volume of black color from previous step, by applying the above equation (I); and (o) tabulating the results.

2. A method for obtaining a tabulation to display a range of colors which can be reproduced with accuracy, according to claim 1, wherein said reference value of total volume is selected between 1, 10, 100 or 1000, preferably 1000.

3. A method for obtaining a tabulation to display a range of colors which can be reproduced with accuracy, according to claim 1, wherein, in order to carry out the obtaining of the gray equivalent in the mixture of equal volumes of said three primary colors, the volume of black color equivalent retaining a 25% of light for cyan color; the volume of black color equivalent retaining a 50% of light for magenta color; and the volume of black color equivalent retaining a 75% of light for yellow color are calculated, in a first stage, by applying said equation (II) $V=T^2/10$, whereby once the black color volumes are obtained for each primary color, every black color volume is complemented with the white color volume required to obtain the 100% volume; with the volumes of black color and white color thus encountered corresponding, upon admixture thereof, to the gray color equivalent for each primary color; and in a second stage the volumes of black color and the volumes of white color corresponding to each primary color are grouped and added to each other, so as to obtain the percentage volume of black color and the percentage volume of white color corresponding to the gray color equivalent for the mixture of said three primary colors, at equal volumes.

4. A method for obtaining a tabulation to display a range of colors which can be reproduced with accuracy, according to claim 1, wherein said method is repeated by varying the values in step (a) as many times as necessary, until the required values are obtained to form a tabulation that will serve as a reference to prepare a catalogue or color chart.

* * * * *